Dec. 30, 1969   D. G. LOUKES ET AL   3,486,877
APPARATUS FOR THE MANUFACTURE OF FLAT GLASS
WITH LIQUID SEAL MEANS
Filed Jan. 30, 1967   2 Sheets-Sheet 1
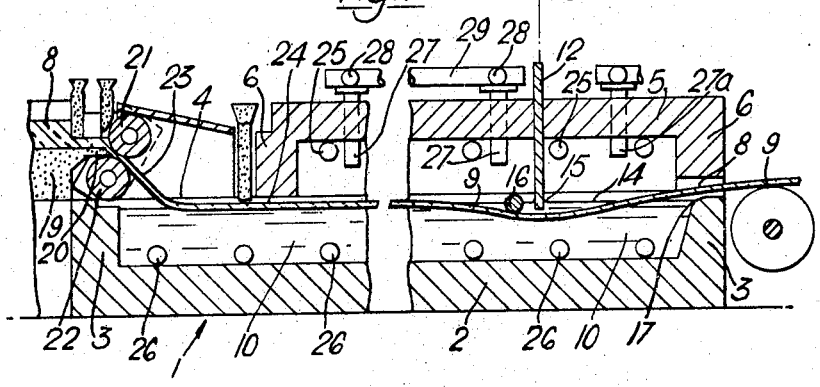
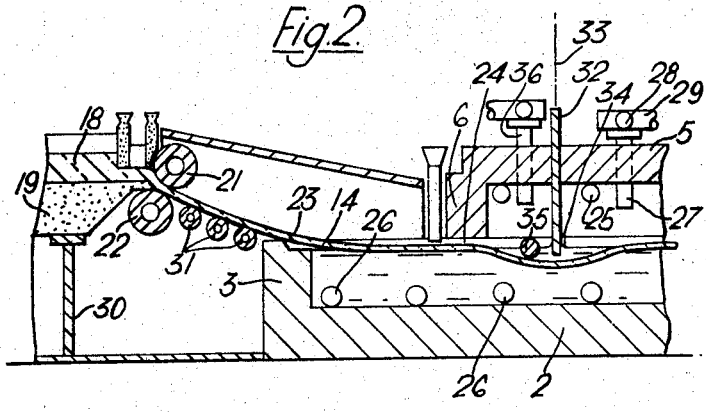
Inventors
David Gordon Loukes
Albert Sidney Robinson
By Morrison, Kennedy & Campbell
Attorneys

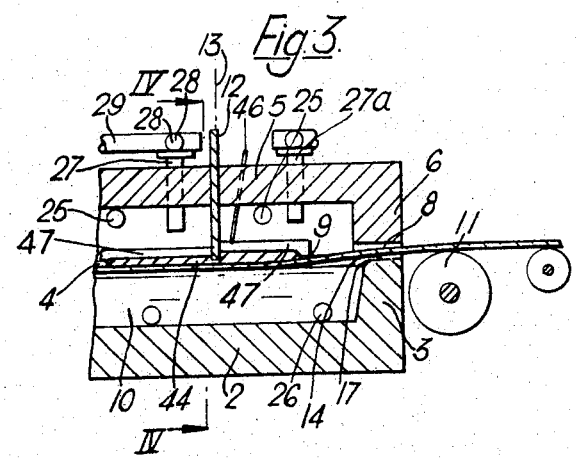
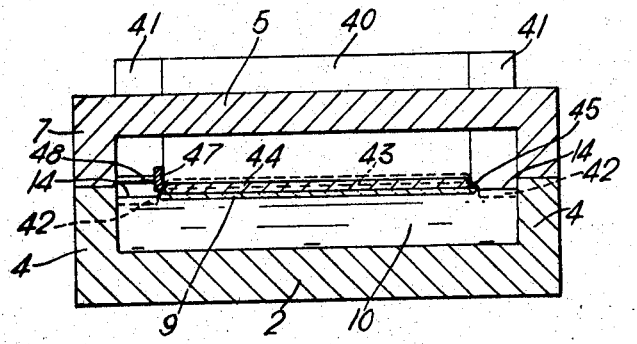

United States Patent Office 3,486,877
Patented Dec. 30, 1969

3,486,877
APPARATUS FOR THE MANUFACTURE OF FLAT GLASS WITH LIQUID SEAL MEANS
David Gordon Loukes, Eccleston Park, Prescot, and Albert Sidney Robinson, Birkdale, Southport, England, assignors to Pilkington Brothers Limited, Liverpool, Lancashire, England, a corporation of Great Britain
Filed Jan. 30, 1967, Ser. No. 612,397
Claims priority, application Great Britain, Feb. 2, 1966, 4,622/66
Int. Cl. C03b 18/02
U.S. Cl. 65—182                                                                                 1 Claim

ABSTRACT OF THE DISCLOSURE

Flat glass in ribbon form is advanced along a bath of molten metal which is held in a tank structure over which a roof structure is supported; a partition in the roof structure depends into close proximity with the path of travel of the ribbon of glass, and a liquid seal is maintained between the bottom of the partition and the top surface of the ribbon.

CROSS REFERENCE TO RELATE APPLICATION

Reference is made to United States Patent No. 3,083,551 (Pilkington Brothers Limited).

BACKGROUND OF THE INVENTION

This invention relates to the manufacture of flat glass.

In the manufacture of flat glass on a molten bath the general practice has been to maintain a plenum of a protecting gas in the headspace defined over the bath. The protecting gas has been supplied to the headspace through ducting provided in a roof structure over the bath connected by branches to headers through which the protecting gas is fed into the headspace at a rate to create a plenum in the headspace. Such arrangement of ducting headers and branches is fully described in the United States Patent No. 3,083,551.

The protecting gas supplied is especially necessary where the bath is a bath of molten metal, for example molten tin or a molten tin alloy having a specific gravity greater than glass, which is in a readily oxidizable state, in which case a non-oxidizing gas is used to cover all the exposed surfaces of the bath. In general the exposed surfaces are at the sides of the ribbon of glass being produced on the bath.

In referring to the temperatures involved in carrying out the process on the bath of molten metal, it can generally be said that at the hot end the temperature is at least 1000° C. and at the discharge or cold end the temperature would be of the order of 650° C.

The protecting gas employed may, as mentioned in the aforesaid Patent Specification, be any suitable inert gas, e.g. nitrogen, that is a gas which will not react chemically with the tin of which the molten bath is, for example constituted in order to avoid production of contaminants for the glass, as for example tin oxide or tin sulphide.

It is a main object of the present invention to facilitate control of the atmosphere in the headspace over the bath by sealing sections of the headspace from each other.

The maintenance of the protecting gas in the headspace over the bath involves the supply of a large amount of non-oxidising atmosphere involving the supply of many thousands of cubic feet of gas per hour because of the leakage of atmosphere from the headspace.

A further object of the invention is to assist the maintenance of a plenum of protecting gas in the headspace, by additionally providing a liquid seal near the inlet end and/or the discharge end of the bath.

SUMMARY

Accordingly the present invention provides apparatus for use in the manufacture of flat glass including a tank structure holding a molten bath of a material of higher specific gravity than that of the glass, and a roof structure over said tank structure and defining a headspace over the bath, the structures defining between them an inlet to the bath for glass and a narrow discharge opening for glass in ribbon form, characterised by a partition in the roof structure across the headspace depending into close proximity with the path of travel of the ribbon of glass, and means for maintaining a liquid seal between the bottom of the partition and the top surface of the ribbon of glass advancing along the bath.

In a preferred embodiment of the invention, the bath is a bath of molten metal and a liquid seal is provided by the metal of the bath itself, this being achieved by arranging the partition so that it depends below the surface level of the molten metal bath and providing means for sufficiently depressing the glass in ribbon form as it approaches the partition to permit passage of the ribbon under the partition on its way to the discharge opening.

Molten glass may be delivered through the inlet to the bath in order to establish a layer of molten glass on the bath, which layer is advanced in ribbon form along the bath. Alternatively a rolled ribbon of glass may be delivered through the inlet to the bath, and the invention also comprehends apparatus including ribbon-forming means associated with said tank structure and operable to deliver a rolled ribbon of glass through said inlet and on to the bath, a second partition in the roof structure across the headspace near to the inlet and depending below the surface level of the molten bath, and means for sufficiently depressing the rolled ribbon of glass as it approaches the partition to permit passage of the ribbon under the partition.

Conveniently a roller is mounted in the tank structure at about the surface level of the bath to divert the ribbon from its normal path on the surface to facilitate movement of the ribbon under either of the partitions intersecting the molten bath near the surface thereof. Take-off means, e.g. a carbon or graphite roller, is provided at the outlet end of the bath for redirecting the ribbon unharmed through the said discharge opening. By the arrangement of a liquid seal near the outlet end of the bath the plenum maintained between the inlet to the bath and the partition near the outlet end can be of the order of 25 mm. of water and the plenum of protecting atmosphere at the discharge end would be maintained at the normal plenum that is say of the order of 4 mm. of water without any increase in the quantity of protective atmosphere fed to the headspace over the bath. The atmosphere at the discharge end is segregated from the atmosphere over the rest of the bath and may have a different composition.

In another embodiment of the invention the ribbon of glass is not diverted from its normal path along the surface of the bath, but the partition is located where the ribbon of glass is taken up from the bath surface for discharge through said opening, and means are provided for maintaining a pool of molten material across the ribbon surface under the partition, into which pool the partition dips to complete the liquid seal.

In one example of this embodiment the bottom of the partition is preferably formed with a central cut-away portion whose lower edge is arranged to dip into the pool of molten material, and with deeper side portions which dip into the molten bath at either side of the path of travel of the ribbon of glass.

Desirably the pool is a pool of molten metal. Preferably the pool is of the same metal as that constituting the bath of molten metal.

Further the invention comprehends, in a method of manufacturing flat glass during which glass in ribbon form is advanced along a bath of molten metal contained in a tank structure, the steps of defining a headspace over the bath of molten metal, dividing the headspace into parts, maintaining a plenum of atmosphere in each part of the headspace, and sealing the parts of the headspace from each other by providing a liquid seal with the upper surface of the ribbon of glass being advanced along the bath.

Further the invention includes segregating sections of the headspace, sealing adjacent sections of the headspace from each other by providing liquid seals with the upper surface of the ribbon of glass being advanced along the bath, and supplying atmospheres having differing characteristics to the sealed sections of the headspace.

BRIEF DESCRIPTION OF THE DRAWINGS

FIGURE 1 is a sectional elevation showing a tank structure and superimposed roof structure as employed in the aforesaid United States Patent No. 3,083,551 and including means according to the invention for maintaining a liquid seal near the discharge end of the tank structure, FIGURE 2 is a sectional elevation of the inlet end of a tank structure and a superimposed roof structure showing the provisions of a liquid seal according to the invention at the inlet end of a bath of molten metal, FIGURE 3 is a sectional elevation, similar to a part of FIGURE 2, showing another form of liquid seal according to the invention near the discharge end of the tank structure, and FIGURE 4 is a section on line IV—IV of FIGURE 3.

DESCRIPTION OF THE PREFERRED EMBODIMENT

Referring now to FIGURE 1 of the drawings, which show one example of apparatus according to the invention a tank structure is generally indicated at 1 and includes a floor 2, end walls 3 and connecting side walls 4. Superimposed on the tank structure is a roof structure including a roof 5, end walls 6 and side walls 7 resting on the side walls 4 of the tank structure.

Between the end walls 3 and 6 of the tank and roof structures at the discharge end of the tank structure is formed a discharge opening 8 through which a ribbon of glass 9 buoyantly supported on a bath 10 of molten metal contained by the tank structure 1 passes to a take-off roller 11 and thence to a lehr (not shown) as is well understood in the art.

The roof structure 5, 6, 7 defines a headspace over the bath of molten metal 10 and adjustably mounted by means, not shown, in the roof structure across the headspace near to the discharge opening 8, is a partition 12, the lower edge of which may be of carbon. The partition 12 is suspended by a usual hanging means, such as is employed for maintaining a setting of tweels in apparatus of the kind described, and generally indicated by the chain line 13.

The partition 12 intersects the surface 14 of the molten bath, and therefore forms a liquid seal 15 of molten material which separates a part of the headspace from the major part of the headspace, that is from the inlet to the bath up to the partition 12, leaving on the discharge side of the partition 12 a relatively small volume of headspace communicating with the discharge outlet 8.

To permit unhindered advance of the ribbon 9 along the bath of molten metal a carbon roller 16 is mounted in the tank structure at about the surface level 14 of the bath to sufficiently depress the ribbon 9 as it is approaching the partition 12 to permit the ribbon to pass under the submerged lower edge of the partition, and the take-off roller 11 is so mounted as to redirect the ribbon 9 through the discharge outlet 8 without the ribbon touching the sill 17 formed on the end wall 3 of the tank structure.

In the apparatus illustrated in FIGURE 1 molten glass 18 flows from a forehearth 19 of a glass melting furnace over a lip 20 to the pass between a pair of water cooled casting rolls 21 and 22 which are disposed above the end wall 3 of the tank structure at the inlet end of the bath. A formed ribbon of glass 23 is produced by the casting rolls 21 and 22 and is delivered on to the surface 14 of the bath of molten metal and advanced along that surface through the inlet opening 24 defined between the end wall 6 of the roof structure at the inlet end of the bath and the surface 14 of the molten metal. A seal may be provided between the lower surface of the inlet end wall 6 and the upper surface of the ribbon of glass by producing laminar flow of protecting gas through the inlet 24 both into and away from the headspace over the bath.

Thermal regulators 25 are mounted in the headspace over the bath and thermal regulators 26 are immersed in the bath. At the inlet end of the apparatus these thermal regulators maintain a temperature of about 1000° C. or higher over a sufficient length of the bath to transform the ribbon 23 into a layer of molten glass from which an advancing buoyant body of glass is developed by permitting unhindered lateral flow of the layer of molten glass. The buoyant body of molten glass is cooled as it is advanced in ribbon form along the bath to produce the ultimate ribbon of glass 9.

Protecting gas is supplied to the part of the headspace between the partition 12 and the inlet end wall 6 of the roof structure through a series of ducts 27, which are connected by branches 28 to headers 29, and by utilising a construction according to the invention and as just described higher plenum pressures, for example 25 mm. of water can be maintained in the headspace for the same expenditure of atmosphere to produce greater protection of the exposed surfaces of the molten metal bath between the inlet 24 and the partition 12 against ingress of ambient atmosphere. Ducts 27a extend through the roof 5 into the headspace at the discharge end of the bath downstream of the partition 12 to maintain the normal plenum pressure and protecting gas for example 4 mm. of water in the part of the headspace at the discharge end of the bath.

Since the part of the headspace upstream of the partition 12 is segregated and sealed from the part at the discharge end of the bath, the atmosphere maintained over the bath upstream of the partition 12 may have a different composition from that at the discharge end. For example the protective atmosphere over the main part of the bath, which is at a pressure of 25 mm. of water, may contain 3% of hydrogen, whereas the atmosphere at the discharge end, where the possibility of contamination is greater, may contain 10% of hydrogen.

As illustrated in FIGURE 2 the invention may also be applied to apparatus for the conveying or superficial treatment of ribbon of glass 23 formed by the casting rolls 21 and 22. The forehearth 19 is supported on a structure 30 and a series of conveying rollers 31 lead the rolled ribbon of glass 23 from the casting rolls 21 and 22 on to the surface 14 of the bath 10 of molten metal.

Thermal conditions along the bath are regulated so that either the rolled ribbon 23 is conveyed unchanged along the bath, or there is superficial melting of the ribbon surfaces to produce "fire-finished" surfaces. The maintenance of the higher plenum in the headspace over the bath is assisted by additionally providing a liquid seal near the inlet end of the bath, and to this end a second partition 32 is mounted in the roof structure across the headspace near to the inlet 24. The partition 32 is hung from adjustable means, indicated at 33, in the same way as the partition 12 of FIGURE 1, and the lower edge of the partition 32 intersects the surface 14 of the bath 10 to form a liquid seal 34.

A carbon depressing roller 35, similar to the roller 16 is mounted just in front of the partition 32 at the surface level of the bath, in order to depress the ribbon of glass 23 as it approaches the partition 32 and permit the ribbon to pass under the submerged lower edge of the partition. Protecting gas at the normal plenum pressure, for example about 4 mm. of water is fed into the part of the headspace upstream of the partition 32, through ducts 36 extending through the roof structure.

It will be appreciated that the immersion of the lower edge of the partitions 12 and 32 could be of the order of 10 mm. The presence over the bath of the higher plenum, that is to say protective atmosphere at a pressure of 25 mm. of water, reduces the possiblity of the ribbon taken from the bath carrying contaminants, arising from contact with the bath, in the circumstances that contaminants due to ingress of ambient atmosphere into the headspace which might affect the quality of the glass are not present at the higher pressures.

Another embodiment of the invention is illustrated in FIGURES 3 and 4. The partition 12 is formed in three parts, namely a central part 40, and two side parts 41. The bottom of the partition is shaped so that it has a central cut-away portion which is located over the path of travel of the ribbon of glass 9 along the bath 10 of molten metal, and deeper side portions 42 formed by the bottoms of the side parts 41 of the partition, which side portions dip into the molten metal bath at either side of the path of travel of the ribbon of glass.

The bottom edge of the central part 40 of the partition is indicated at 43, and the partition is located so that this edge 43 is spaced from but is in close proximity to the path of travel of the upper surface of the ribbon of glass 9. A pool of molten metal 44 is maintained on the upper surface of the ribbon of glass and the lower edge 44 of the partition dips into this pool so that a liquid seal is provided between the partition and the upper surface of the glass.

The inner faces of the deeper side portions 42 are also slightly cut away as indicated at 45 so as to allow unhindered passage of the ribbon of glass under the partition while ensuring only a small clearance between the side portions and the edges of the ribbon of glass.

The molten metal forming the pool 44 may be the same as the bath metal, and is replenished as necessary through a supply pipe 46. Side bars 47 of a non-wettable material, e.g. carbon are located by supports 48 just above the surface of the margins of the glass to restrain the sides of the pool. For the sake of clarity only one of the side bars 47 is shown in FIGURE 4. The pool is held in position against the tendency to move with the ribbon of glass towards the discharge end of the bath, by the upward slope of the ribbon as it is continuously lifted from the bath surface for discharge through the opening 8. This ensures that the pool 44 remains stationary on the upper surface of the ribbon of glass, so that the desired seal is assured. The plenum of, for example, 25 mm. of water maintained at the upstream side of the partition 12 tends to depress the surface level of the part of the pool on that side of the partition, while the surface level of the part of the pool on the downstream side, where the pressure of protecting gas is, for example, 4 mm. of water, will rise, as indicated to an exaggerated scale in FIGURES 3 and 4 for the sake of clarity. This difference in the surface level of the two parts of the pool, for example 3.5 mm. of molten tin, is not so great however as to detract from the maintenance of the liquid seal underneath the partition 12.

As an alternative to the use of the side bars 47, the edges of the ribbon of glass may be turned up so that the ribbon of glass has a shallow trough-like configuration in which the sealing pool of molten material is confined.

The invention may also be applied to segregating and sealing other sections of the headspace over the bath from each other, when it is desired to maintain atmospheres having different characteristics over different parts of the bath, for example an atmosphere containing a vaporised salt for treating the ribbon surface. When a partition as illustrated in FIGURES 3 and 4 is employed at a more central location of the tank structure or at the inlet end of the bath, a carbon bar may extend across the ribbon of glass, just above the glass surface, at the low pressure side of the sealing pool in order to maintain the pool in position beneath the partition, against any tendency of the pool to be carried forwardly on the ribbon of glass from the high atmosphere pressure side to the low atmosphere pressure side of the partition.

As an alternative to the three-part partition 40, 41 which is illustrated in FIGURE 4, the partition with its cut-away bottom edge may be made in one piece.

Accordingly, the present invention comprehends the product produced on a bath of molten metal over which the higher plenum of protecting atmosphere is maintained, the plenum being of the order of 25 mm. of water, that is to say seven or eight times as great as the plenum at present generally utilised.

What is claimed:

1. Apparatus for use in the manufacture of flat glass including a tank structure holding a bath of molten metal, a roof structure over the tank structure defining a headspace over the bath, said structures defining between them an inlet to the bath for glass and a narrow discharge opening located above the surface of the bath for glass in ribbon form which has advanced along the bath surface, partition means in the roof structure near said discharge opening having a lower edge located just above the upper surface of the glass ribbon supported on the bath surface and dividing a section of said headspace upstream of the partition from a section downstream thereof, means for moving the ribbon of glass in an upwardly sloping direction from the surface of the bath to said discharge opening to effect its removal from the tank structure, lateral barriers adjacent opposite edges of said ribbon of glass extending from said partition downstream for a distance sufficient to form a trough with said upwardly sloping ribbon of glass, and means for maintaining in said trough a pool of molten metal which seals off the upstream headspace from the downstream headspace at the lower edge of said partition when the pressure of atmosphere in the upstream headspace is substantially higher than pressure of the atmosphere in the downstream headspace.

References Cited

UNITED STATES PATENTS

| | | | |
|---|---|---|---|
| 2,968,892 | 1/1961 | Pilkington | 65—99 |
| 2,968,893 | 1/1961 | Pilkington | 65—99 |
| 3,326,651 | 6/1967 | Javaux | 65—99 X |
| 3,345,149 | 10/1967 | Michalik et al. | 65—99 |
| 3,356,476 | 12/1967 | Gulotta | 65—99 X |

S. LEON BASHORE, Primary Examiner

E. R. FREEDMAN, Assistant Examiner

U.S. Cl. X.R.

65—32, 65, 99, 157